US012464296B2

(12) United States Patent
Hertzberg

(10) Patent No.: US 12,464,296 B2
(45) Date of Patent: Nov. 4, 2025

(54) HEARING AID WITH OWN-VOICE MITIGATION

(71) Applicant: NUANCE HEARING LTD., Tel Aviv (IL)

(72) Inventor: Yehonatan Hertzberg, Shoham (IL)

(73) Assignee: Nuance Hearing Ltd., Tel-Aviv (IL)

( * ) Notice: Subject to any disclaimer, the term of this patent is extended or adjusted under 35 U.S.C. 154(b) by 129 days.

(21) Appl. No.: 18/476,369

(22) Filed: Sep. 28, 2023

(65) Prior Publication Data

US 2025/0113149 A1 Apr. 3, 2025

(51) Int. Cl.
*H04R 25/00* (2006.01)

(52) U.S. Cl.
CPC ....... *H04R 25/407* (2013.01); *H04R 2225/39* (2013.01); *H04R 2225/43* (2013.01)

(58) Field of Classification Search
CPC .............. H04R 25/407; H04R 2225/39; H04R 2225/43
See application file for complete search history.

(56) References Cited

U.S. PATENT DOCUMENTS

| | | | |
|---|---|---|---|
| 3,119,903 | A | 1/1964 | Rosemond et al. |
| 4,904,078 | A | 2/1990 | Gorike |
| 5,091,952 | A | 2/1992 | Williamson et al. |
| 5,263,089 | A | 11/1993 | Ribic |
| 5,793,875 | A | 8/1998 | Lehr et al. |
| 6,289,327 | B1 | 9/2001 | Woodsum et al. |
| 6,434,539 | B1 | 8/2002 | Woodsum et al. |
| 7,031,483 | B2 | 4/2006 | Boone et al. |
| 7,092,690 | B2 | 8/2006 | Zancewicz |
| 7,099,486 | B2 | 8/2006 | Julstrom et al. |
| 7,103,192 | B2 | 9/2006 | Bailey |
| 7,369,669 | B2 | 5/2008 | Hagen et al. |
| 7,369,671 | B2 | 5/2008 | Sacha |
| 7,542,580 | B2 | 6/2009 | Burns |
| 7,609,842 | B2 | 10/2009 | Sipkema et al. |
| 7,735,996 | B2 | 6/2010 | Van Der Zwan et al. |

(Continued)

FOREIGN PATENT DOCUMENTS

| | | | |
|---|---|---|---|
| CA | 2297344 | A1 | 8/2000 |
| CN | 205608327 | U | 9/2016 |

(Continued)

OTHER PUBLICATIONS

EP Application # 20877167.5 Search Report dated Dec. 4, 2023.

(Continued)

*Primary Examiner* — Suhan Ni
(74) *Attorney, Agent, or Firm* — Meitar Patents Ltd.; Daniel Kligler

(57) ABSTRACT

A system for hearing assistance includes an array of microphones, which are configured be mounted in proximity to a head of a user of the system and to output electrical signals in response to first acoustic waves that are incident on the microphones. A speaker is configured for mounting in proximity to an ear of the user and configured to output second acoustic waves in response to a drive signal applied to the speaker. Processing circuitry is configured to generate the drive signal by amplifying and filtering the electrical signals using a beamforming filter that emphasizes first sounds that impinge on the array of microphones within a selected angular range while suppressing second sounds that are spoken by the user.

9 Claims, 3 Drawing Sheets

(56) References Cited

U.S. PATENT DOCUMENTS

| | | | |
|---|---|---|---|
| 7,809,149 | B2 | 10/2010 | Burns |
| 7,822,217 | B2 | 10/2010 | Hagen et al. |
| 8,116,493 | B2 | 2/2012 | Westermann |
| 8,139,801 | B2 | 3/2012 | Sipkema et al. |
| 8,494,193 | B2 | 7/2013 | Zhang et al. |
| 8,611,554 | B2 | 12/2013 | Short et al. |
| 8,744,101 | B1 | 6/2014 | Burns |
| 9,113,245 | B2 | 8/2015 | Gelhard |
| 9,282,392 | B2 | 3/2016 | Ushakov |
| 9,288,589 | B2 | 3/2016 | Cheung |
| 9,392,381 | B1 | 7/2016 | Park et al. |
| 9,591,410 | B2 | 3/2017 | Short et al. |
| 9,635,474 | B2 | 4/2017 | Kuster |
| 9,641,942 | B2 | 5/2017 | Strelcyk et al. |
| 9,734,822 | B1 | 8/2017 | Sundaram et al. |
| 9,753,311 | B2 | 9/2017 | Fan |
| 9,763,016 | B2 | 9/2017 | Merks et al. |
| 9,781,523 | B2 | 10/2017 | Kuster et al. |
| 9,810,925 | B2 | 11/2017 | Fan |
| 9,812,116 | B2 | 11/2017 | Ushakov |
| 9,832,576 | B2 | 11/2017 | Jensen et al. |
| 9,980,054 | B2 | 5/2018 | McCracken |
| 10,056,091 | B2 | 8/2018 | Orescanin et al. |
| 10,102,850 | B1 | 10/2018 | Basye et al. |
| 10,225,670 | B2 | 3/2019 | Feilner et al. |
| 10,231,065 | B2 | 3/2019 | Udesen |
| 10,353,221 | B1 | 7/2019 | Graff et al. |
| 10,379,386 | B2 | 8/2019 | Fan |
| D865,040 | S | 10/2019 | Schaal et al. |
| D874,008 | S | 1/2020 | Kotzer et al. |
| 10,567,888 | B2 | 2/2020 | Hertzberg et al. |
| 10,582,295 | B1 | 3/2020 | Zhong et al. |
| 10,721,572 | B2 | 7/2020 | Petersen et al. |
| 10,805,739 | B2 | 10/2020 | Sjursen |
| 10,820,121 | B2 | 10/2020 | Lunner et al. |
| 11,259,127 | B2 | 2/2022 | De Haan et al. |
| 11,363,389 | B2 | 6/2022 | Pedersen et al. |
| 11,510,019 | B2 | 11/2022 | Rohde et al. |
| 11,521,633 | B2 | 12/2022 | Liu |
| 2004/0076301 | A1 | 4/2004 | Algazi et al. |
| 2004/0252845 | A1 | 12/2004 | Tashev |
| 2006/0013416 | A1 | 1/2006 | Truong et al. |
| 2007/0038442 | A1 | 2/2007 | Visser et al. |
| 2008/0192968 | A1 | 8/2008 | Ho et al. |
| 2009/0028367 | A1 | 1/2009 | Klinkby |
| 2009/0296044 | A1 | 12/2009 | Howell et al. |
| 2009/0323973 | A1 | 12/2009 | Dyba |
| 2011/0091057 | A1 | 4/2011 | Derkx et al. |
| 2011/0194715 | A1 | 8/2011 | Pape et al. |
| 2011/0293129 | A1 | 12/2011 | Dillen et al. |
| 2012/0128175 | A1 | 5/2012 | Visser et al. |
| 2012/0215519 | A1 | 8/2012 | Park et al. |
| 2012/0224715 | A1 | 9/2012 | Kikkeri |
| 2014/0093091 | A1 | 4/2014 | Dusan et al. |
| 2014/0093093 | A1 | 4/2014 | Dusan et al. |
| 2014/0270316 | A1 | 9/2014 | Kopina et al. |
| 2015/0036856 | A1 | 2/2015 | Pruthi et al. |
| 2015/0049892 | A1 | 2/2015 | Petersen et al. |
| 2015/0201271 | A1 | 7/2015 | Diethorn et al. |
| 2015/0230026 | A1 | 8/2015 | Eichfeld et al. |
| 2015/0289064 | A1 | 10/2015 | Jensen et al. |
| 2016/0111113 | A1 | 4/2016 | Cho et al. |
| 2017/0272867 | A1 | 9/2017 | Zisapel et al. |
| 2018/0146285 | A1 | 5/2018 | Benattar et al. |
| 2018/0270565 | A1 | 9/2018 | Ganeshkumar |
| 2018/0330747 | A1 | 11/2018 | Ebenezer |
| 2018/0350379 | A1 | 12/2018 | Wung et al. |
| 2018/0359294 | A1 | 12/2018 | Brown et al. |
| 2019/0104370 | A1 | 4/2019 | Zisapel et al. |
| 2019/0373355 | A1 | 12/2019 | Lee et al. |
| 2019/0394586 | A1 | 12/2019 | Pedersen et al. |
| 2020/0005770 | A1 | 1/2020 | Lunner et al. |
| 2021/0345047 | A1 | 11/2021 | Sabin et al. |
| 2022/0201403 | A1 | 6/2022 | Khaleghimeybodi et al. |
| 2023/0336926 | A1 | 10/2023 | Hertzberg et al. |
| 2024/0096340 | A1 | 3/2024 | Malik et al. |

FOREIGN PATENT DOCUMENTS

| | | | |
|---|---|---|---|
| CN | 106157965 | A | 11/2016 |
| CN | 206115061 | U | 4/2017 |
| CN | 206920741 | U | 1/2018 |
| CN | 207037261 | U | 2/2018 |
| CN | 208314369 | U | 1/2019 |
| CN | 208351162 | U | 1/2019 |
| CN | 209693024 | U | 11/2019 |
| CN | 209803482 | U | 12/2019 |
| CN | 113940097 | A | 1/2022 |
| CN | 114631331 | A | 6/2022 |
| EP | 1439736 | A1 | 7/2004 |
| EP | 4093055 | A1 | 11/2022 |
| ES | 1213304 | U | 5/2018 |
| KR | 20130054898 | A | 5/2013 |
| KR | 101786613 | B1 | 10/2017 |
| KR | 102006414 | B1 | 8/2019 |
| WO | 9960822 | A1 | 11/1999 |
| WO | 2004016037 | A1 | 2/2004 |
| WO | 2013169618 | A1 | 11/2013 |
| WO | 2017129239 | A1 | 8/2017 |
| WO | 2017158507 | A1 | 9/2017 |
| WO | 2017171137 | A1 | 10/2017 |
| WO | 2018127298 | A1 | 7/2018 |
| WO | 2018127412 | A1 | 7/2018 |
| WO | 2018234628 | A1 | 12/2018 |
| WO | 2021014344 | A1 | 1/2021 |
| WO | 2021074818 | A1 | 4/2021 |
| WO | 2022133086 | A1 | 6/2022 |
| WO | 2025068818 | A1 | 4/2025 |

OTHER PUBLICATIONS

Pauline et al., "Variable tap-length non-parametric variable step-size NLMS adaptive filtering algorithm for acoustic echo cancellation," Applied Acoustics, Elsevier, vol. 159, pp. 1-10, Feb. 2020.

Spriet et al., "Feedback control in hearing aids," Springer Handbook of Speech Processing and Speech Communication (Chapter 48, Part H.—Speech Enhancement; Benesty et al., eds.), Springer, pp. 1-29, year 2007.

Hoydal, "A New Own Voice Processing System for Optimizing Communication," The Hearing Review, pp. 1-8, Nov. 2017, as downloaded from https://hearingreview.com/practice-building/marketing/new-voice-processing- system-optimizing-communication.

Wikipedia, "Least Mean Squares Filter," pp. 1-6, last edited Jul. 23, 2019.

Camacho et al., "Phase Coherence Imaging: Principles, applications and current developments," POMA—Proceedings of Meetings on Acoustics, 2019 International Congress on Ultrasonics, Signal Processing in Acoustics: PSP (2/3) Presentation 1, pp. 1-7, year 2019.

Hertzberg, U.S. Appl. No. 18/491,847, filed Oct. 23, 2023.

Widrow et al., "Microphone Arrays for Hearing Aids: An Overview", Speech Communication, vol. 39, pp. 139-146, year 2003.

Bose Hearphones™, "Hear Better", pp. 1-3, Feb. 19, 2017.

Veen et al., "Beamforming Techniques for Spatial Filtering", CRC Press, pp. 1-23, year 1999.

"iCE40 Series MobileFPGA Family," Product Information, Lattice Semiconductor, Santa Clara, Calif., pp. 1-2, last updated May 13, 2021, as downloaded from https://www.mouser.co.il/new/lattice-semiconductor/lattice-ice40-FPGA/.

Choi et al., "Blind Source Separation and Independent Component Analysis: A Review," Neural Information Processing—Letters and Review, vol. 6, No. 1, pp. 1-57, year 2005.

Mukai et al., "Real-Time Blind Source Separation and DOA Estimation Using Small 3-D Microphone Array," Proceedings of the International Workshop on Acoustic Echo and Noise Control (IWAENC), pp. 45-48, year 2005.

Huang et al., "Real-Time Passive Source Localization: A Practical Linear-Correction Least-Squares Approach," IEEE Transactions on

(56) References Cited

OTHER PUBLICATIONS

Speech and Audio Processing, vol. 9, No. 8, pp. 943-956, year 2001.
Sawada et al., "Direction of Arrival Estimation for Multiple Source Signals Using Independent Component Analysis," IEEE Proceedings of the Seventh International Symposium on Signal Processing and its Applications, vol. 2, pp. 1-4, year 2003.
Adavanne et al., "Direction of Arrival Estimation for Multiple Sound Sources Using Convolutional Recurrent Neural Network," 26th European Signal Processing Conference (EUSIPCO), IEEE, pp. 1462-1466, year 2018.
Byrne et al., "An International Comparison of Long-Term Average Speech Spectra," The Journal of the Acoustical Society of America, vol. 96, No. 4, pp. 2108-2120, year 1994.
Wikipedia, "Direction of Arrival," pp. 1-2, last edited Nov. 15, 2020.
Dibiase, "A High-Accuracy, Low-Latency Technique for Talker Localization in Reverberant Environments Using Microphone Arrays," Doctoral Thesis, Division of Engineering, Brown University, Providence, Rhode Island, pp. 1-122, year 2000.
Alkaher et al., "Temporal Howling Detector for Speech Reinforcement Systems," MDPI, Acoustics, vol. 4, pp. 967-995, year 2022.
Van Waterschoot, "Fifty Years of Acoustic Feedback Control: State of the Art and Future Challenges," Proceedings of the IEEE, vol. 99, No. 2, pp. 288-327, Feb. 2011.
U.S. Appl. No. 17/766,736 Office Action dated Jan. 11, 2024.
Chen et al., "Novel Radiation Pattern by Genetic Algorithms in Wireless Communication," Proceedings of the IEEE Vts 53rd Vehicular Technology Conference, pp. 8-12, year 2001.
Mitchell, "An Introduction to Genetic Algorithms," MIT Press, pp. 1-162, year 1998.
Haupt, "An Introduction to Genetic Algorithms for Electromagnetics," IEEE Antennas and Propagation Magazine, vol. 37, No. 2, pp. 7-15, Apr. 1995.
Elbir et al., "Twenty-Five Years of Advances in Beamforming: From Convex and Nonconvex Optimization to Learning Techniques," IEEE Signal Processing Magazine, vol. 40, No. 4, pp. 118-131, Jun. 2023.
International Application # PCT/IB2024/058971 Search Report dated Jan. 20, 2025.
International Application # PCT/IB2024/058969 Search Report dated Jan. 23, 2025.
CN Application # 202080050547.6 Office Action dated Mar. 27, 2025.
Chinese Office Action Application No. 202480004953.7, dated Sep. 13, 2025.
PCT International Search Report and Written Opinion # PCT/IL2025050272, dated Jul. 15, 2025.
"Communication pursuant to Article 94(3) EPC," European patent application # 20 877 167.5, dated Jul. 1, 2025.

HEARING AID WITH OWN-VOICE MITIGATION

FIELD

The present invention relates generally to hearing aids, and particularly to devices and methods for improving directional hearing.

BACKGROUND

Speech understanding in noisy environments is a significant problem for the hearing-impaired. Hearing impairment is usually accompanied by a reduced time resolution of the sensorial system in addition to a gain loss. These characteristics further reduce the ability of the hearing-impaired to filter the target source from the background noise and particularly to understand speech in noisy environments.

Some newer hearing aids offer a directional hearing mode to improve speech intelligibility in noisy environments. This mode makes use of an array of microphones and applies beamforming technology to combine multiple microphone inputs into a single, directional audio output channel. The output channel has spatial characteristics that increase the contribution of acoustic waves arriving from the target direction relative to those of the acoustic waves from other directions.

For example, PCT International Publication WO 2017/158507, whose disclosure is incorporated herein by reference, describes hearing aid apparatus, including a case, which is configured to be physically fixed to a mobile telephone. An array of microphones are spaced apart within the case and are configured to produce electrical signals in response to acoustical inputs to the microphones. An interface is fixed within the case, along with processing circuitry, which is coupled to receive and process the electrical signals from the microphones so as to generate a combined signal for output via the interface.

As another example, PCT International Publication WO 2021/074818, whose disclosure is incorporated herein by reference, describes apparatus for hearing assistance, which includes a spectacle frame, including a front piece and temples, with one or more microphones mounted at respective first locations on front piece and the configured to output electrical signals in response to first acoustic waves that are incident on the microphones. A speaker mounted at a second location on one of the temples outputs second acoustic waves. Processing circuitry generates a drive signal for the speaker by processing the electrical signals output by the microphones so as to cause the speaker to reproduce selected sounds occurring in the first acoustic waves with a delay that is equal within 20% to a transit time of the first acoustic waves from the first location to the second location, thereby engendering constructive interference between the first and second acoustic waves.

SUMMARY

Embodiments of the present invention that are described hereinbelow provide improved devices and methods for hearing assistance.

The present invention will be more fully understood from the following detailed description of the embodiments thereof, taken together with the drawings in which:

DETAILED DESCRIPTION

Overview

Figure 1:
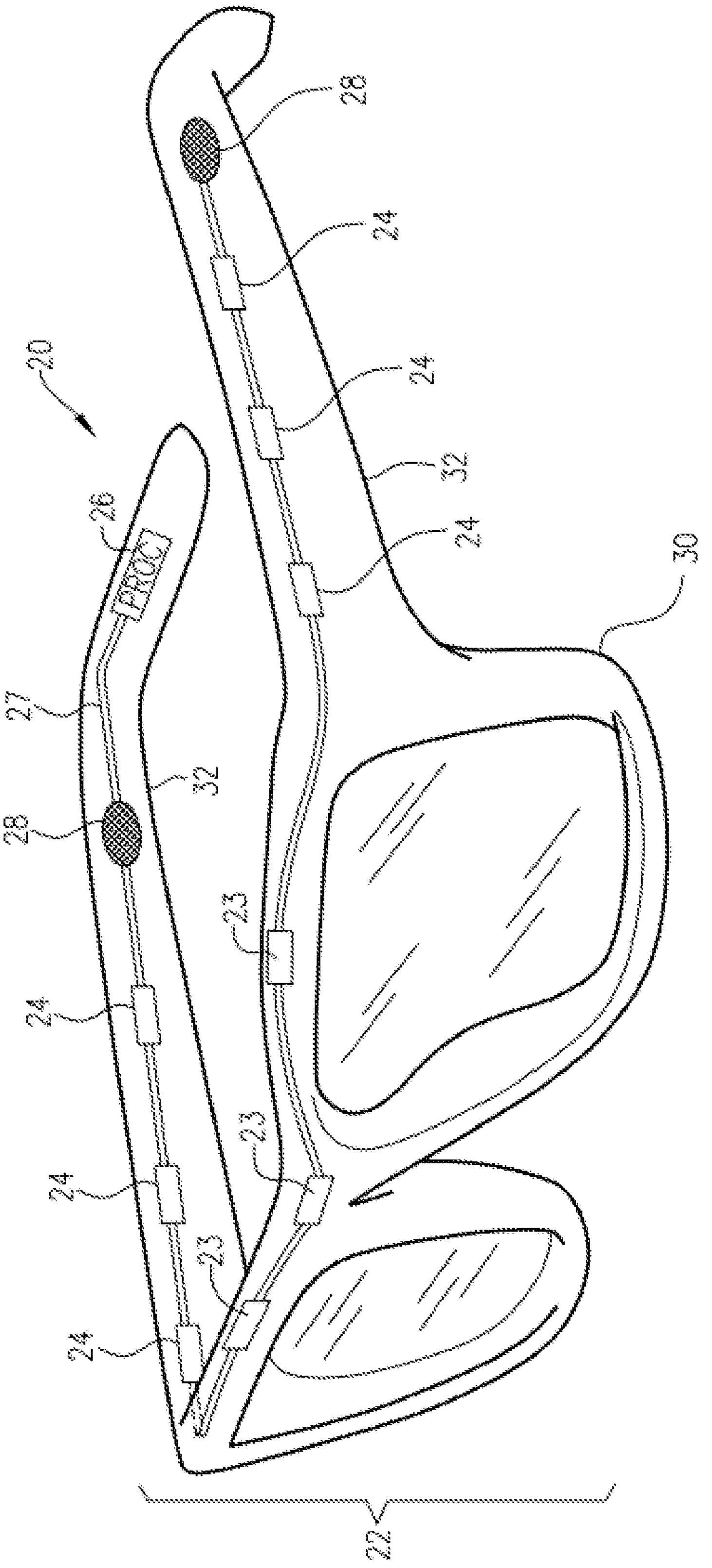
FIG. 1 is a schematic pictorial illustration showing a hearing assistance device based on a spectacle frame, in accordance with an embodiment of the invention.

Despite the need for directional hearing assistance and the theoretical benefits of microphone arrays in this regard, in practice the directional performance of hearing aids falls far short of that achieved by natural hearing. In general, good directional hearing assistance requires a relatively large number of microphones, spaced well apart, in a design that is unobtrusive while enabling the user to aim the directional response of the hearing aid easily toward a point of interest, such as toward a conversation partner in noisy environment. Processing circuitry applies a beamforming filter to the signals output by the microphones in response to incident acoustic waves to generate an audio output that emphasizes sounds that impinge on the microphone array within an angular range around the direction of interest while suppressing background noise. The audio output should reproduce the natural hearing experience as nearly as possible while minimizing bothersome artifacts.

One of these artifacts is the user's own voice. The proximity of the user's mouth to the microphones causes the processing circuitry to capture and amplify the user's voice together with the sounds received from the direction of interest in the environment. Users find the amplified sound of their own voice to be unnatural and disturbing. In some cases, amplification of the user's voice may mask sounds from the environment that the user wishes to hear.

Embodiments of the present invention that are described herein address this problem using a novel beamforming filter, which emphasizes sounds that impinge on an array of microphones within a selected angular range while suppressing sounds that are spoken by the user. In the disclosed embodiments, an array of microphones, mounted in proximity to the head of a user, outputs electrical signals in response to incoming acoustic waves that are in incident on the microphones. A speaker, mounted in proximity to the user's ear, outputs acoustic waves in response to a drive signal. Processing circuitry generates the drive signal by amplifying and filtering the electrical signals using the beamforming filter.

In some embodiments, the processing circuitry detects that the user is speaking and applies the beamforming filter to suppress the sounds spoken by the user in response to such detection. For this purpose, for example, the processing circuitry may apply two different beamforming filters: one that suppresses the sounds spoken by the user and another that does not. Both filters emphasize sounds within the selected angular range, but the filter that does not suppress sounds spoken by the user typically gives superior directivity in the beamforming pattern, as well as reduced white noise gain relative to the filter that suppresses the user's own voice. Therefore, the filter that does not suppress sounds spoken by the user is preferred for use as long as the user is not actually speaking. The processor applies the beamforming filter that suppresses the user's own voice upon detecting that the user is speaking. The processing circuitry may detect which of the beamforming filters should be used at any given time by computing and comparing the relative power levels output by the beamforming filters.

In some embodiments, the microphones and speaker are mounted on a frame that is mounted on the user's head. In the embodiments that are described below, the microphones and speakers are mounted on a spectacle frame. To mitigate the effect of the user's own voice, the processing circuitry applies a beamforming filter that suppresses sounds that originate from a location below the spectacle frame. Alternatively, the microphones and speaker can be mounted on other sorts of frames, such as a Virtual Reality (VR) or Augmented Reality (AR) headset, or in other sorts of mounting arrangements.

System Description

FIG. 1 is a schematic pictorial illustration of a hearing assistance device 20 that is integrated into a spectacle frame 22, in accordance with another embodiment of the invention. An array of microphones 23, 24 are mounted at respective locations on spectacle frame 22 and output electrical signals in response to acoustic waves that are incident on the microphones. In the pictured example, microphones 23 are mounted on a front piece 30 of frame 22, while microphones 24 are mounted on temples 32, which are connected to respective edges of front piece 30. Although the extensive array of microphones 23 and 24 that is shown in FIG. 1 is useful in some applications of the present invention, the principles of signal processing and hearing assistance that are described herein may alternatively be applied, mutatis mutandis, using smaller numbers of microphones. For example, these principles may be applied using an array of microphones 23 on front piece 30, as well as in devices using other microphone mounting arrangements, not necessarily spectacle-based.

Processing circuitry 26 is fixed within or otherwise connected to spectacle frame e 22 and is coupled by electrical wiring 27, such as traces on a flexible printed circuit, to receive the electrical signals output from microphones 23, 24. Although processing circuitry 26 is shown in FIG. 1, for the sake of simplicity, at a certain location in temple 32, some or all of the processing circuitry may alternatively be located in front piece 30 or in a unit connected externally to frame 22. Processing circuitry 26 mixes the signals from the microphones so as to generate an audio output with a certain directional response, for example by applying beamforming functions so as to emphasize the sounds that originate within a selected angular range while suppressing background sounds originating outside this range. Typically, although not necessarily, the directional response is aligned with the angular orientation of frame 22.

In addition, processing circuitry 26 detects when the user is speaking and applies a beamforming function that suppresses sounds spoken by the user, while emphasizing the sounds that impinge on the array of microphones within a selected angular range. These signal processing functions of circuitry 26 are in described greater detail hereinbelow. Alternatively, processing circuitry 26 may apply a beamforming filter that suppresses sounds spoken by the user at all times, regardless of whether or not the user is speaking.

Processing circuitry 26 may convey the audio output to the user's ear via any suitable sort of interface and speaker. In the pictured embodiment, the audio output is created by a drive signal for driving one or more audio speakers 28, which are mounted on temples 32, typically in proximity to the user's ears. Although only a single speaker 28 is shown on each temple 32 in FIG. 1, device 20 may alternatively comprise only a single speaker on one of temples 32, or it may comprise two or more speakers mounted on one or both of temples 32. In this latter case, processing circuitry 26 may apply a beamforming function in the drive signals so as to direct the acoustic waves from the speakers toward the user's ears. Alternatively, the drive signals may be conveyed to speakers that are inserted into the ears or may be transmitted over a wireless connection, for example as a magnetic signal, to a telecoil in a hearing aid (not shown) of a user who is wearing the spectacle frame.

Signal Processing

Figure 2:
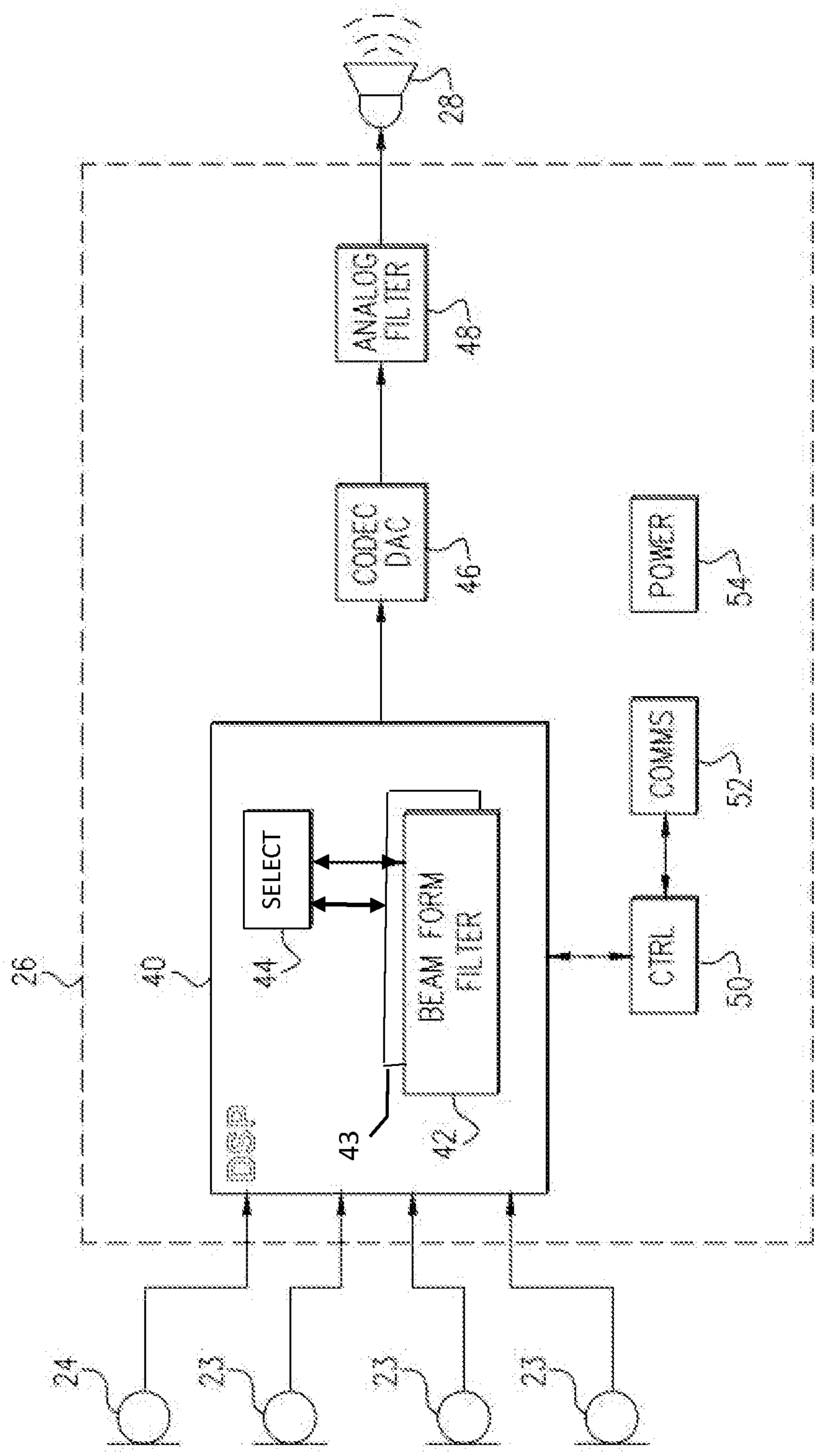
FIG. 2 is a block diagram that schematically shows details of a hearing assistance device, in accordance with an embodiment of the invention.

FIG. 2 is a block diagram that schematically shows details of processing circuitry 26 in hearing assistance device 20, in accordance with an embodiment of the invention. Processing circuitry 26 can be implemented in a single integrated circuit chip or alternatively, the functions of processing circuitry 26 may be distributed among multiple chips, which may be located within or outside spectacle frame 22. Although one particular implementation is shown in FIG. 2, processing circuitry 26 may alternatively comprise any suitable combination of analog and digital hardware circuits, along with suitable interfaces for receiving the electrical signals output by microphones 23, 24 and outputting drive signals to speakers 28.

In the present embodiment, microphones 23, 24 comprise integral analog/digital converters, which output digital audio signals to processing circuitry 26. Alternatively, processing circuitry 26 may comprise an analog/digital converter for converting analog outputs of the microphones to digital form. Processing circuitry 26 typically comprises suitable programmable logic components 40, such as a digital signal processor (DSP) or a gate array, which implement the necessary filtering and mixing functions to generate and output a drive signal for speaker 28 in digital form.

These filtering and mixing functions typically include application of two beamforming filters 42, 43 with coefficients chosen to create the desired directional responses. Specifically, the coefficients of filter 42 are calculated to emphasize sounds that impinge on frame 22 (and hence on microphones 23, 24) within a selected angular range; while the coefficients of filter 43 are calculated to emphasize sounds that impinge on frame 22 within this selected angular range while suppressing sounds spoken by the user of device 20, which originate from a location below frame 22. Details of filters that may be used for these purposes are described further hereinbelow.

Alternatively or additionally, processing circuitry 26 may comprise a neural network (not shown), which is trained to determine and apply the coefficients to be used in filters 42 and 43. Further alternatively or additionally, processing circuitry 26 comprises a microprocessor, which is programmed in software or firmware to carry out at least some of the functions that are described herein.

Processing circuitry 26 may apply any suitable beamforming functions that are known in the art, in either the time domain or the frequency domain, in implementing filters 42, 43. Beamforming algorithms that may be used in this context are described, for example, in the above-mentioned PCT International Publication WO 2017/158507 (particularly pages 10-11) and in U.S. Pat. No. 10,567,888 (particularly in col. 9).

In one embodiment, processing circuitry 26 applies a Minimum Variance Distortionless Response (MVDR) beamforming algorithm in deriving the coefficients of beamforming filters 42 and 43. This sort of algorithm is advantageous in achieving fine spatial resolution and discriminating between originating from the sounds direction of interest and sounds originating from the user's own speech. The MVDR algorithm maximizes the signal-to-noise ratio (SNR) of the audio output by minimizing the average energy (while keeping the target distortion small). The algorithm can be implemented in frequency space by calculating a vector of complex weights F(ω) for the output signal from each microphone at each frequency as expressed by the following formula:

$$F(\omega) = \frac{W^H(\omega)S_{zz}^{-1}(\omega)}{W^H(\omega)S_{zz}^{-1}(\omega)W(\omega)}$$

In this formula, W(ω) is the propagation delay vector between microphones 23, representing the desired response of the beamforming filter as a function of angle and frequency; and $S_{zz}(\omega)$ is the cross-spectral density matrix, representing a covariance of the acoustic signals in the time-frequency domain. To compute the coefficients of filter 42, $S_{zz}(\omega)$ is measured or calculated for isotropic far-field noise. To compute the coefficients of filter 43, the cross-spectral density matrix for the user's own voice is added to the far-field noise.

In an alternative embodiment, processing circuitry 26 applies a Linearly Constrained Minimum Variance (LCMV) algorithm in deriving the coefficients of beamforming filters 42 and 43. LCMV beamforming causes the filters to pass signals from a desired direction with a specified gain and phase delay, while minimizing power from interfering signals and noise from all other directions. An additional constraint is imposed in computing filter 43 to specifically nullify output power coming from the direction of the user's mouth.

In some embodiments, processing circuitry 26 comprises selection logic 44, which selects the beamforming filter to that is to be applied at any given time. Selection logic 44 chooses the beamforming filter based on whether or not the user is speaking. The selection decision may be based on the outputs of beamforming filters 42 and 43 themselves. For this purpose, processing circuitry 26 applies both of beamforming filters 42 and 43 to the electrical signals output by microphones 23, 24 and computes respective power levels $P_1$ and $P_2$ output beamforming filters 42 and 43, respectively. Selection logic 44 compares the power levels, for example by application of a threshold to the ratio of the power levels. As long as $P_1/P_2$ is less than the threshold, selection logic 44 chooses filter 42. When $P_1/P_2$ exceeds the threshold, selection logic 44 chooses filter 43. The threshold may be preset, or it may alternatively be adjusted adaptively and/or according to user preferences.

An audio output circuit 46, for example comprising a suitable codec and digital/analog converter, converts the digital drive signal output from filters 42 and 43 to analog form. An analog filter 48 performs further filtering and analog amplification functions so as to optimize the analog drive signal to speaker 28.

A control circuit 50, such as an embedded microcontroller, controls the programmable functions and parameters of processing circuitry 26, possibly including selection logic 44. A communication interface 52, for example a Bluetooth® or other wireless interface, enables the user and/or an audiology professional to set and adjust these parameters as desired. A power circuit 54, such as a battery inserted into temple 32, provides electrical power to the other components of the processing circuitry.

Method of Operation

Figure 3:
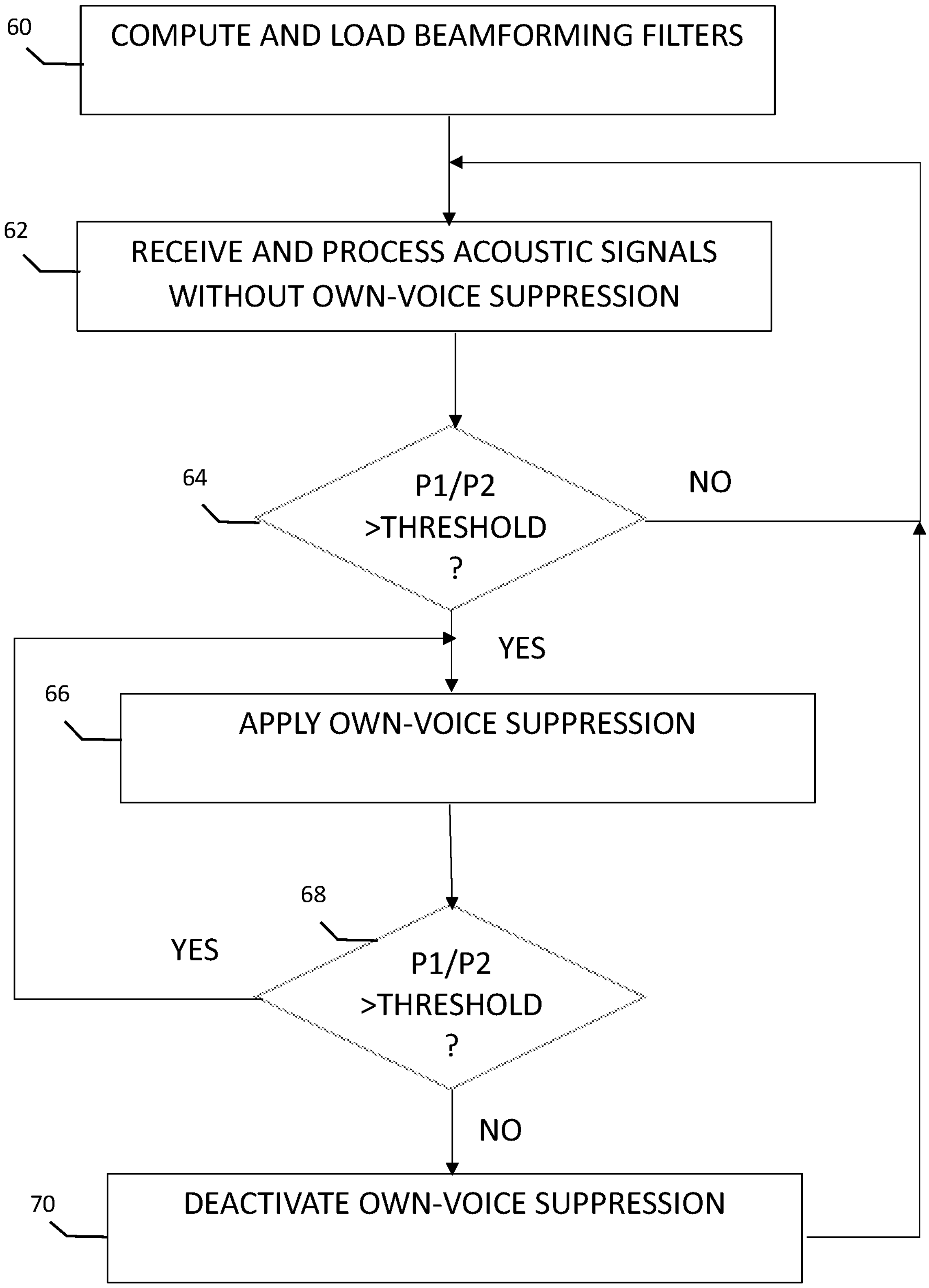
FIG. 3 is a flow chart that schematically illustrates a method for operation of a hearing assistance device, in accordance with an embodiment of the invention.

FIG. 3 is a flow chart that schematically illustrates a method for operation of a hearing assistance device with own-voice suppression, in accordance with an embodiment of the invention. The method is described hereinbelow, for the sake of concreteness and clarity, with reference to the components of device as 20, described above. Alternatively, the principles of this method may be applied in other devices and systems with suitable microphone arrays and signal processing capabilities.

In preparation for real-time application of the method, beamforming filters 42 and 43 are computed and loaded into device 20, at a filter computation step 60. The filters may be predefined and loaded at the time of manufacture of device 20, based on standardized spatial response parameters. Alternatively or additionally, the filter coefficients may be optimized for the user, taking into account parameters such as the user's physiology, hearing deficiency, and subjective preferences.

Initially, when device 20 is turned on, selection logic 44 chooses filter 42, so that acoustic signals from microphones 23, 24 are processed without own-voice suppression, at a standard beamforming step 62. processing circuitry 26 Periodically, applies both beamforming filters 42 and 43 to the electrical signals output by microphones 23, 24 and compares the respective power levels $P_1$ and $P_2$ that are output by beamforming filters 42 and 43, at a power comparison step 64. As long as the ratio $P_1/P_2$ remains less than the applicable threshold, selection logic 44 continues to apply filter 42.

Detection that $P_1/P_2$ has exceeded the threshold at step 64 is taken as an indication that the user of device 20 has begun to speak. In this case, selection logic 44 switches to filter 43, at an own-voice suppression step 66. Optionally, to avoid rapid toggling between filters 42 and 43, which may be disturbing to the user, selection logic 44 applies a time lag in applying and removing the beamforming filter after detecting that the user has begun or ceased to speak. For this purpose, for example, the selection logic may apply a smoothing filter to the power values:

$$\overline{P_n^t} = \alpha\overline{P_n^{t-1}} + (1-\alpha)P_n^t$$

In this expression, $P_n^t$ is the measured value of $P_1$ or $P_2$ at time t, and the filter coefficient α has a value between zero and one. Selection logic 44 uses the ratio $\overline{p_1^t}/\overline{p_2^t}$ in deciding when to change the filtering mode.

Additionally or alternatively, upon detecting that the user has begun to speak (or has subsequently ceased to speak), processing circuitry 26 may blend beamforming filters 42 and 43 during a transition period to avoid sharp changes in the acoustic output to speaker 28. For this purpose, the processing circuitry blends the filter coefficients using a blend factor β, which varies gradually over time between zero and one. During the transition period, the vector of filter coefficients F applied by processing circuitry 26 is a linear combination of the respective coefficient vectors $F_1$ and $F_2$ of filters 42 and 43: $F=(1-\beta)F_1+BF_2$. The value of β may be computed, for example, using the following algorithm in a series of incremental steps over time, using small values γ and ε between zero and one:

If $P_1/P_2$ > threshold, $\beta=\beta+\gamma$, else $\beta=\beta-\varepsilon$.

If $\beta>1$, $\beta=1$.

If $\beta<0$, $\beta=0$.

Returning to FIG. 3, while processing circuitry 26 applies own-voice suppression using filter 43 at step 66, selection logic 44 continues to check the ratio $P_1/P_2$, at a further power comparison step 68. As long as the ratio remains above the threshold, processing circuitry 26 continues to apply own-voice suppression at step 66. When the ratio drops below the threshold, however, selection logic 44 switches back to beamforming filter 42, at an own-voice suppression deactivation step 70. The same time lag and blending procedures that were described above may be applied in step 70, as well, mutatis mutandis. Operation of device 20 continues at step 62 until further changes are detected.

Examples

Example 1. A system for hearing assistance comprises an array of microphones, which are configured be mounted in proximity to a head of a user of the system and to output electrical signals in response to first acoustic waves that are incident on the microphones. A speaker is configured for mounting in proximity to an ear of the user and configured to output second acoustic waves in response to a drive signal applied to the speaker. Processing circuitry is configured to generate the drive signal by amplifying and filtering the electrical signals using a beamforming filter that emphasizes first sounds that impinge on the array of microphones within a selected angular range while suppressing second sounds that are spoken by the user.

Example 2. The system according to example 1, wherein the processing circuitry is configured to detect that the user is speaking and to apply the beamforming filter to suppress the second sounds responsively to detecting that the user is speaking.

Example 3. The system according to example 2, wherein the beamforming filter that suppresses the second sounds is a first beamforming filter, and wherein the processing circuitry is configured to apply a second beamforming filter, which emphasizes the first sounds without suppressing the second sounds, as long as the user is not speaking, and to apply the first beamforming filter upon detecting that the user is speaking.

Example 4. The system according to example 3, wherein the processing circuitry is configured to detect that the user is speaking by applying both the first and the second beamforming filters to the electrical signals and comparing respective power levels output by the first and second beamforming filters.

Example 5. The system according to example 3 or 4, wherein the processing circuitry is configured, upon detecting that the user has begun or ceased to speak, to generate the drive signal by blending the first and second beamforming filters during a transition period.

Example 6. The system according to any of examples 2-5, wherein the processing circuitry is configured to apply a time lag in applying and removing the beamforming filter after detecting that the user has begun or ceased to speak.

Example 7. The system according to any of examples 1-6, wherein the beamforming filter comprises a minimum variance distortionless response (MVDR) beamformer.

Example 8. The system according to any of examples 1-6, wherein the beamforming filter comprises a linearly constrained minimum variance (LCMV) beamformer.

Example 9. The system according to any of examples 1-8, and comprising a frame configured for mounting on the head, wherein the microphones and the speaker are mounted at respective locations on the frame.

Example 10. The system according to example 9, wherein the frame comprises a spectacle frame.

Example 11. A head-mountable device, comprising a frame configured for mounting on a head of a user. An array of microphones are mounted at respective locations on the frame and are configured to output electrical signals in response to first acoustic waves that are incident on the microphones. A speaker is mounted on the frame and is configured to output second acoustic waves in response to a drive signal applied to the speaker. Processing circuitry is configured to generate the drive signal by amplifying and filtering the electrical signals using a beamforming filter that emphasizes first sounds that impinge on the array of microphones within a selected angular range while suppressing second sounds that originate from a location below the spectacle frame.

Example 12. The device according to example 11, wherein the frame comprises a spectacle frame.

Example 13. The device according to example 12, wherein the spectacle frame comprises a front piece and temples connected to respective edges of the front piece, wherein at least some of the microphones are mounted on the front piece, and the speaker is mounted on one of the temples.

The features of any of examples 2-7 may similarly be applied to any of examples 11-13.

Example 14. A method for hearing assistance comprises mounting in proximity to a head of a user an array of microphones, which output electrical signals in response to first acoustic waves that are incident on the microphones. A speaker is mounted in proximity to an ear of the user and outputs second acoustic waves in response to a drive signal applied to the speaker. The drive signal is generated by amplifying and filtering the electrical signals using a beamforming filter that emphasizes first sounds that impinge on the array of microphones within a selected angular range while suppressing second sounds that are spoken by the user.

The features of any of examples 2-10, 12 and 13 may similarly be applied to example 14.

The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A system for hearing assistance, comprising:

an array of microphones, which are configured be mounted in proximity to a head of a user of the system and to output electrical signals in response to first acoustic waves that are incident on the microphones;

a speaker, which is configured for mounting in proximity to an ear of the user and configured to output second acoustic waves in response to a drive signal applied to the speaker; and processing circuitry, which is configured to generate the drive signal by amplifying and filtering the electrical signals using a beamforming filter that emphasizes first sounds that impinge on the array of microphones within a selected angular range while suppressing second sounds that are spoken by the user wherein, in generating the drive signal, the processing circuitry is configured to detect that the user is speaking and to apply the beamforming filter to suppress the second sounds responsively to detecting that the user is speaking, wherein the beamforming filter that suppresses the second sounds is a first beamforming filter, and wherein the processing circuitry is configured to apply a second beamforming filter, which emphasizes the first sounds without suppressing the second sounds, as long as the user is not speaking, and to apply the first beamforming filter upon detecting that the user is speaking, and wherein the processing circuitry is configured to detect that the user is speaking by applying both the first and the second beamforming filters to the electrical signals and comparing respective power levels output by the first and second beamforming filters.

2. The system according to claim 1, wherein the processing circuitry is configured, upon detecting that the user has begun or ceased to speak, to generate the drive signal by blending the first and second beamforming filters during a transition period.

3. The system according to claim 1, wherein the processing circuitry is configured to apply a time lag in applying and removing the beamforming filter after detecting that the user has begun or ceased to speak.

4. The system according to claim 1, wherein the beamforming filter comprises minimum variance distortionless response (MVDR) beamformer.

5. The system according to claim 1, wherein the beamforming filter comprises a linearly constrained minimum variance (LCMV) beamformer.

6. The system according to claim 1, and comprising a frame configured for mounting on the head, wherein the microphones and the speaker are mounted at respective locations on the frame.

7. The system according to claim 6, wherein the frame comprises a spectacle frame.

8. A method for hearing assistance, comprising:

mounting in proximity to a head of a user an array of microphones, which output electrical signals in response to first acoustic waves that are incident on the microphones;

mounting in proximity to an ear of the user a speaker, which outputs second acoustic waves in response to a drive signal applied to the speaker; and generating the drive signal by amplifying and filtering the electrical signals using a beamforming filter that emphasizes first sounds that impinge on the array of microphones within a selected angular range while suppressing second sounds that are spoken by the user, wherein generating the drive signal comprises detecting that the user is speaking and applying the beamforming filter to suppress the second sounds responsively to detecting that the user is speaking, wherein the beamforming filter that suppresses the second sounds is a first beamforming filter, and wherein generating the drive signal comprises filtering the electrical signals using a second beamforming filter, which emphasizes the first sounds without suppressing the second sounds, as long as the user is not speaking, and applying the first beamforming filter upon detecting that the user is speaking, and wherein detecting that the user is speaking comprises applying both the first and the second beamforming filters to the electrical signals and comparing respective power levels output by the first and second beamforming filters.

9. The method according to claim 8, wherein generating the drive signal comprises applying a time lag in applying and removing the beamforming filter after detecting that the user has begun or ceased to speak.

* * * * *